H. A. BLANCHARD.
HAT SEWING MACHINE.
APPLICATION FILED DEC. 24, 1912.

1,161,595.

Patented Nov. 23, 1915.
8 SHEETS—SHEET 4.

Witnesses

Inventor
Helen A. Blanchard
By Sturtevant Mason
Attorneys

H. A. BLANCHARD.
HAT SEWING MACHINE.
APPLICATION FILED DEC. 24, 1912.

1,161,595.

Patented Nov. 23, 1915.
8 SHEETS—SHEET 5.

Witnesses

Inventor
H. A. Blanchard
By
Attorneys

UNITED STATES PATENT OFFICE.

HELEN A. BLANCHARD, OF PHILADELPHIA, PENNSYLVANIA, ASSIGNOR TO UNION SPECIAL MACHINE COMPANY, OF CHICAGO, ILLINOIS, A CORPORATION OF ILLINOIS.

HAT-SEWING MACHINE.

1,161,595.  Specification of Letters Patent.  Patented Nov. 23, 1915.

Application filed December 24, 1912. Serial No. 738,484.

*To all whom it may concern:*

Be it known that I, HELEN A. BLANCHARD, a citizen of the United States, residing at Philadelphia, in the county of Philadelphia, State of Pennsylvania, have invented certain new and useful Improvements in Hat-Sewing Machines, of which the following is a description, reference being had to the accompanying drawing and to the figures of reference marked thereon.

The invention relates to new and useful improvements in sewing machines, and more particularly to machines of this class which are adapted for stitching the reed cover to a hat body.

An object of the invention is to provide a stitching mechanism, wherein a reed cover may be stitched to a hat body by stitches passing through the reed cover and the hat body, which stitches may be comparatively widely spaced.

A further object of the invention is to provide a stitching mechanism for the above purpose, wherein a single thread may be formed into a loop by an eye-pointed needle, and carried through the reed cover and hat body to the outer face thereof, where said loop is transferred to a hook needle and brought back again to the inner face of the hat body and reed cover, and interlocked by the next succeeding needle loop, as it is passed through the hat body.

These and other objects will in part be obvious, and will in part be hereinafter more fully disclosed.

In the drawings, which show by way of illustration one embodiment of the invention.

Figure 1:
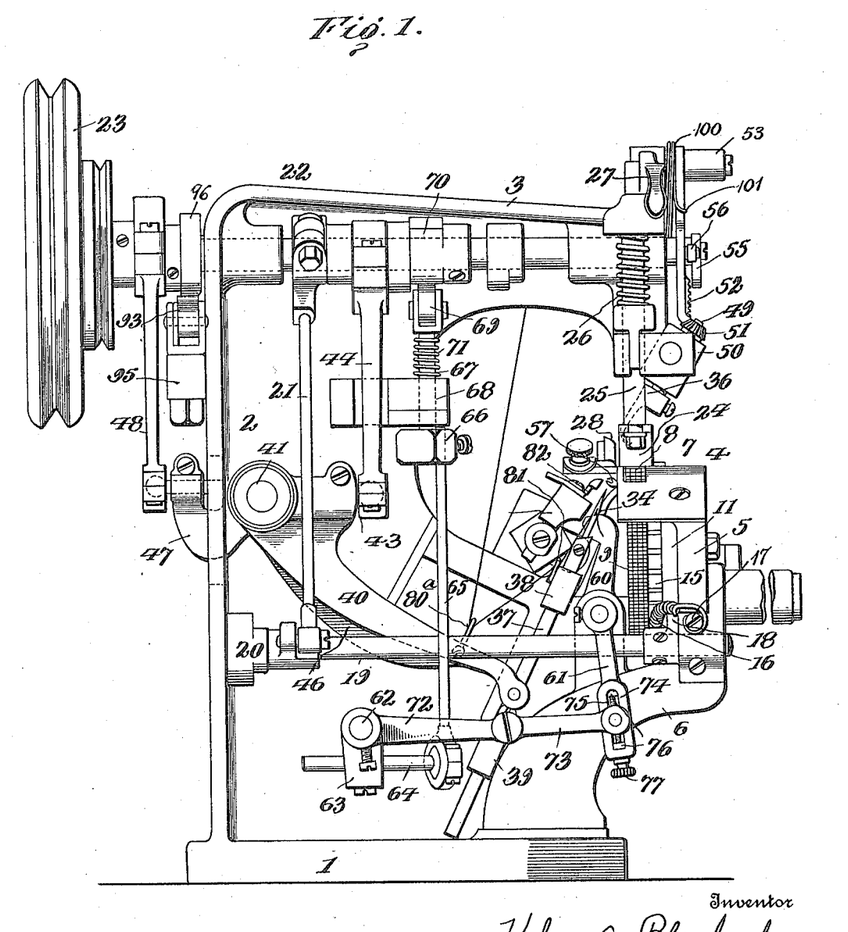
Figure 1 is a rear side elevation of a sewing machine embodying my improvements.
Figure 2:
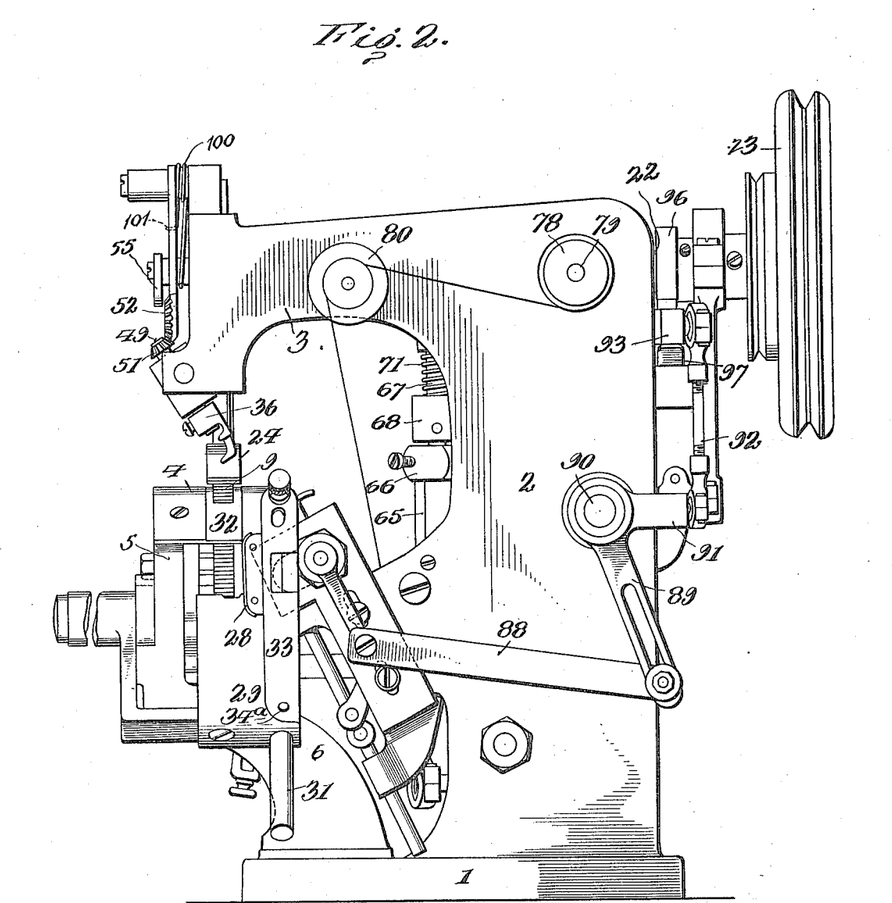
Fig. 2 is a front side elevation thereof.
Figure 3:
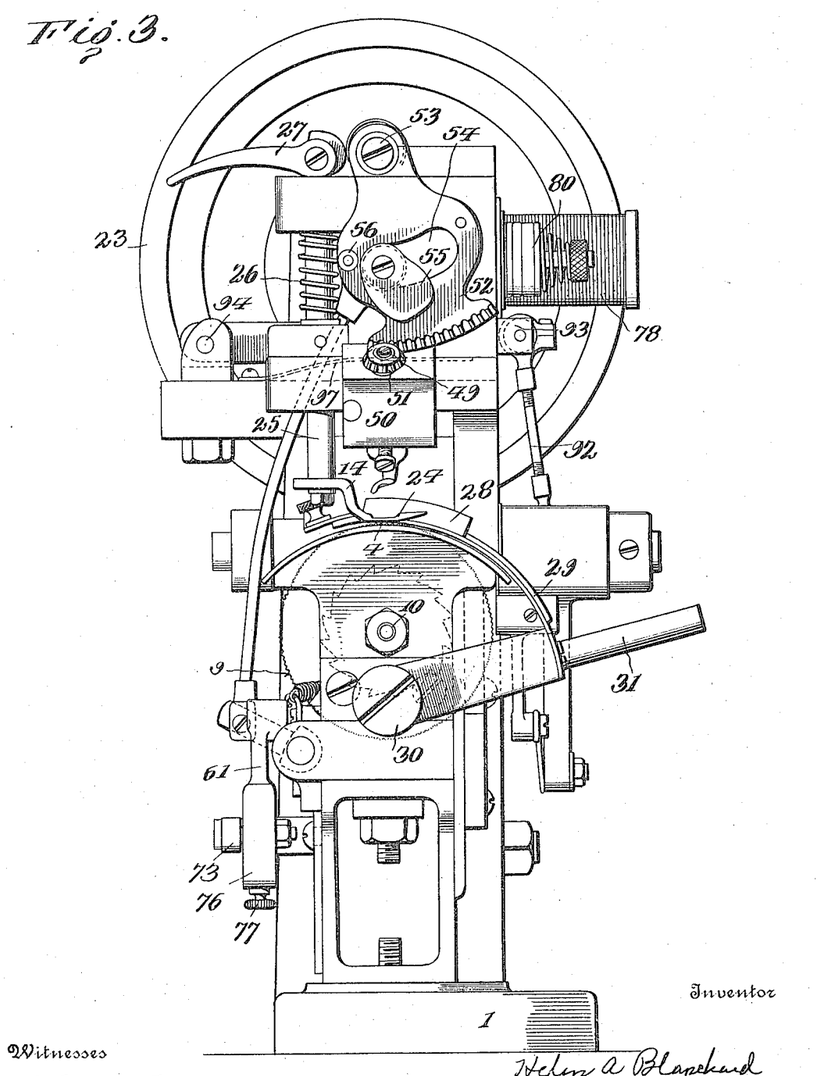
Fig. 3 is a front end view of the machine.
Figure 4:
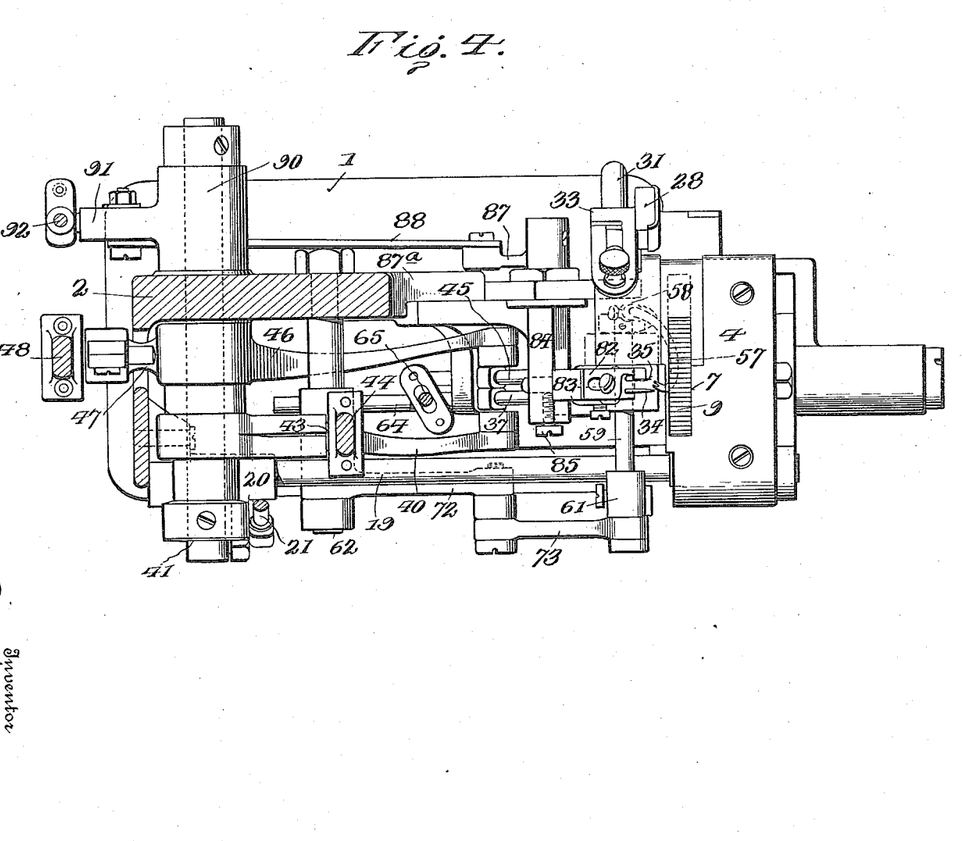
Fig. 4 is a horizontal sectional view taken at a point above the work support.
Figure 5:
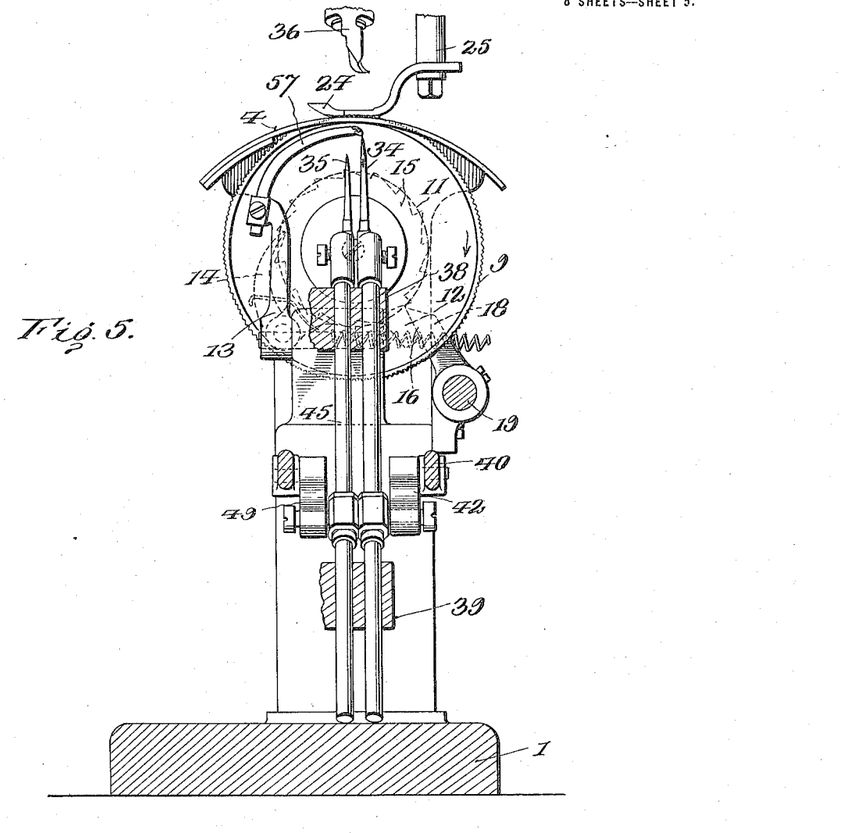
Fig. 5 is a vertical sectional view at a point inside of the work support and showing the needle bars and looper mechanism in side elevation.

In carrying out the invention, I have provided a sewing machine which is formed with a supporting base 1, from which rises a standard 2, carrying an over-hanging arm 3. Also extending from the supporting base 1 is a work support 4. This work support, as clearly shown in Figs. 1, 2 and 3, is curved on the arc of a circle. The cloth plate of the work support, on which the body of the hat rests during the stitching operation, is mounted on a bracket arm 5, carried by an extension 6, which is a part of the frame supported by the supporting base 1. This cloth plate is formed with slot 7, through which project the teeth 8 of a rotatable feed wheel 9. This feed wheel 9 is mounted to turn upon a pivotal support 10, which is carried by the bracket 5, on which the cloth plate is mounted. The feed wheel 9 is mounted so as to rotate freely upon this pivotal support 10. Also mounted to turn freely on the pivot support 10 for the feed wheel is a collar 11. This collar 11 is formed with a radially projecting lug 12, see Fig. 5, and a radially projecting arm 13, on which is pivotally supported a pawl 14, adapted to coöperate with a ratchet wheel 15, attached to, and moving with the feed wheel 9. The pawl 14 is held in engagement with the ratchet wheel by a suitable spring 16, which is connected at one end to the pawl, and at its other end to an arm or screw 17, mounted on the bracket 5. This spring not only holds the pawl in engagement with the teeth of the ratchet wheel, but also tends to swing the collar 11 on its support so as to bring the lug 12 into contact with an arm 18 mounted on the shaft 19.

The shaft 19 is mounted at one end in a suitable bearing carried by the bracket 5, and at its other end, in a bearing 20, carried by the supporting standard. This shaft is oscillated by a link 21, which engages an eccentric on the main shaft 22. As the main shaft 22 is rotated through the belt wheel 23, the shaft 19 will be oscillated, which will, in turn, swing the arm 18 and, through the lug 16, move the collar 11, so as to cause the pawl 14 to turn the ratchet wheel 15, and thereby turn the feed wheel 9. Through this step by step movement of the ratchet wheel, the feed wheel is moved intermittently, and as the hat body rests on said feed wheel, said hat body will be moved step by step to position the same for the successive stitches.

The hat body, indicated at H in Figs. 9 to 12, is inserted in the machine so that it rests on the work support 4, and the feed wheel 9 engages the reed cover C at the inner face thereof. The rim R of the hat projects upwardly substantially vertically during the stitching operation. The reed cover C encircles the rim R, and the purpose of my stitching machine is to baste or secure this reed cover to the hat body. The hat body is held on the work support, and against the feed wheel by a presser foot 24. This presser foot 24 is carried by a presser bar 25, mounted to slide vertically in suitable lugs carried at the forward end of the over-hanging arm 3. A spring 26 normally holds the presser foot depressed against the outer surface of the hat body. A cam lever 27 is secured at the upper end of the presser bar 25 and serves as a means for raising the presser foot. As a means for guiding the hat body to the stitching mechanism, I have provided a guiding shoe 28, which is mounted upon a circular plate 29, pivotally supported on a pin 30, carried by the bracket 5. A handle 31 is attached to this plate and serves as a means to move the same about its pivotal axis, so that the guiding shoe 28 may be brought to a point opposite the stitching point, where the feed wheel engages the hat body. The cloth plate is formed with a depression 32, which serves as a guide for the reed cover. The circular plate 29 is so spaced from the cloth plate that said circular plate will extend over the reed cover, and support the hat body, while the reed and reed cover are fed underneath this circular plate, and brought into contact with the hat body only at the stitching point, or adjacent thereto. The guiding shoe 28 is mounted on a yielding segment 33, which is pivotally secured at 34ª to the circular plate 29. This yielding segment extends in advance of the edge of the circular plate 29.

The stitching mechanism consists of an eye-pointed needle 34, a hook needle 35, and a looper 36. The eye-pointed needle 34 is carried by a needle bar 37, which reciprocates in the lugs 38 and 39 carried by the frame of the machine. A lever 40 is pivoted at 41 to the frame and is connected by a short link 42 to the needle bar 37. This lever 40 has a forwardly extending arm 43, carrying a ball stud, which is engaged by a link or eccentric strap 44, which, in turn, coöperates with an eccentric on the main shaft 22. The hook needle 35 is carried by a needle bar 45 which is also mounted to reciprocate in the supporting lugs 38 and 39. A lever 46 is pivoted to the supporting stud 41 and is provided with a rearwardly extending arm 47, carrying a ball stud, to which the link or eccentric strap 48 is connected, and this eccentric strap 48, in turn, coöperates with an eccentric on the main shaft 22. The lever 46 is connected by a short link 49 to the needle bar 45.

The looper 36, above referred to, is carried by an inclined shaft 49, which is mounted in a suitable bracket 50, bolted to the forward end of the over-hanging arm. The shaft 49 supporting the looper is parallel with the longitudinal axis of the needle bar 37 and also the longitudinal axis of the needle bar 45. This shaft, at the upper end, carries a bevel gear 51, which meshes with a segmental rack 52, pivoted at 53 to the overhanging arm. The segmental rack 52 is provided with a slot 54. The main shaft 22 extends through the overhanging arm and through the slot 54. On the forward end of the main shaft 22 is a cam plate 55, which is adapted to contact with a roller 56, carried by a stud secured to the segmental rack 52. This segmental rack, which is operated in one direction by the cam 55, is controlled in the opposite direction by the spring 100, the end of which 101 bears upon this segmental rack. As the main shaft 22 rotates, the cam plate 55 contacting with the roller 56 will oscillate the segment 52 about its pivotal support 53. The oscillation of this segment will rotate the shaft 49 carrying the looper, so as to cause said looper to engage the needle loop thrown out by the eye-pointed needle, and position the same so it will be engaged by the hook needle. The devices for operating the eye-pointed needle, the hook needle and the looper, are so timed relative to one another that the looper thread thrown out by the eye-pointed needle is transferred to the hook needle, after which the hook needle descends, carrying the loop with it, through the hat body and the reed cover.

Figure 6:
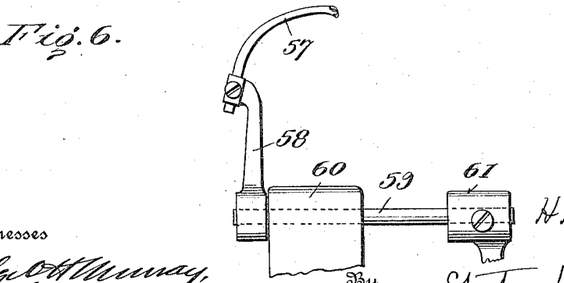
Fig. 6 is an enlarged detail showing the loop spreader and the support therefor.
Figure 7:
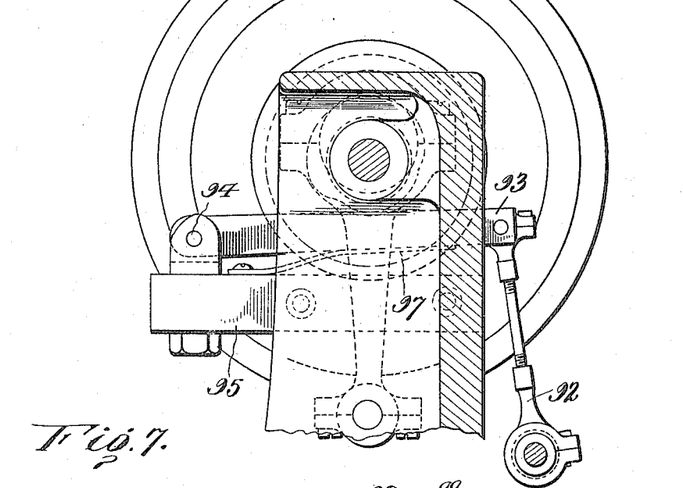
Fig. 7 is a detail partly in vertical section, showing the mechanism for operating the loop spreader.

In order to assist the hook needle in positioning and supporting the loop of needle thread carried thereby, so that the eye-pointed needle as it ascends will pass into and through said loop, I have provided a loop spreader 57. This loop spreader 57 is adjustably mounted in an arm 58, see Fig. 6, carried by a shaft 59 mounted to oscillate in a lug 60 carried by the frame of the machine. The shaft 59 at its outer end carries an arm 61. A short shaft 62 is mounted in a suitable bearing in the frame of the machine, and this short shaft carries a downwardly projecting lug 63, in which is adjustably mounted an arm 64. A rod 65 engages a ball stud on the outer end of the arm 64. The upper end of the rod 65 is adjustably secured to the head 66 carried at the lower end of a vertically reciprocating bar 67. This bar 67 slides in a suitable support 68. The upper end of the bar is forked and is provided with a roller 69 which engages a cam 70 on the main shaft 22. A spring 71 encircles the bar 67 and bears at one end against the support 68, while the other end of the spring bears against the forked head at the upper end of the bar. This spring normally holds the roller 69 in contact with the cam, and also holds the outer end of the arm 64 raised.

Mounted on the shaft 62 is an arm 72. As the main shaft rotates, the cam 70 through the bar 67 and the rod 65 will oscillate the shaft 62, which will move the arm 72 up and down. A link 73 is pivoted to the outer end of the arm 72. This link at its other end is pivoted to a stud adjustably mounted in a slot 74 in the lower end of the arm 61, which is connected with the shaft 60 on which the spreader is supported. A threaded bolt 75 extends lengthwise of the slot 74, and the stud to which the link 73 is pivoted is carried by this threaded bolt. Said threaded bolt is formed with spaced collars 76, and has a head 77 at its lower end, through which the threaded bolt may be turned. By turning the threaded bolt, the stud is moved lengthwise of the slot and thereby the stroke of the spreader varied.

The thread is supplied to the needle from a spool 78 carried by a suitable supporting pin 79 on the overhanging arm. The thread passes from the supply through a suitable tension 80, and thence to a thread guide 80ª on the needle lever 40 and then through a guide 81 carried on the upper supporting lug 38, in which the needle bar reciprocates.

A finger 82 is adjustably mounted on an arm 83 carried by a shaft 84. Said shaft 84 is bored transversely thereof, and the arm 83 extends into said opening. A screw 85 engages the arm and holds the same in adjusted positions in the shaft 84. This shaft is mounted to turn freely in a sleeve 86, which is clamped to a suitable slotted bracket 87ª, mounted on the frame of the machine. The other end of the shaft 84 carries an arm 87 which projects downwardly therefrom. This arm 87 (see Fig. 8), is pivotally connected to a link 88, which in turn is pivotally connected to the slotted arm 89 of a rock shaft 90 pivoted to the supporting frame. The other arm 91 of the rock shaft is pivotally connected to a link 92. This link 92 is pivotally connected at its upper end to a lever 93, fulcrumed at 94 on a bracket 95 mounted on the head of the machine. This lever 93 is adapted to engage a cam 96 on the main shaft 92. A spring 97 engages the under face of the lever and normally holds said lever pressed into contact with the cam.

The operation of my device will be apparent from the diagrammatic views shown in Figs. 9 to 13. The hat body to which the reed cover is to be basted or stitched, is placed on the cloth support 4, and the presser foot lowered so as to engage the outer face thereof. The reed and reed cover are fed underneath the circular plate 29, through the guiding recess 32. The guiding shoe 38 is brought to a point opposite the stitching mechanism, so as to engage the rim of the hat body and guide the same. The pointed needle 34 is raised and penetrates the reed cover and hat body. As soon as the needle reaches the upper end of its stroke (see Fig. 10), the looper 36 is moved into the needle loop thrown out as the needle is slightly retracted, and this loop is carried by the looper to a position where the retracting movement of the hook needle 35 causes the hook thereof to engage the loop, (see Fig. 11). As soon as the hook needle is well engaged into the needle loop, the looper is retracted, so as to release the needle loop, and the hook needle moves downward with the eye-pointed needle, carrying the loop engaged thereby down through the hat body and the reed cover through the opening formed by the hook needle. As soon as the hook needle moves out of the hat body and reed cover, the feed wheel 9 is moved to position the hat body for the next stitching operation. This movement of the hat body carries the base of the needle loop forward, and this movement of the base of the needle loop, together with the downward movement of the hook needles, lays said loop on to the loop spreader 57. This loop spreader is formed with a forked forward end 98. The upper arm of the fork is slightly raised, thus forming a shoulder 99 in the rear thereof. This loop spreader is also moved forward during this positioning of the needle loop, and as a result of these combined movements, one strand of the needle loop is laid into the forked end 98 of the loop spreader. The needles are timed so that the eye-pointed needle rises first, and as soon as the point thereof is well into the needle loop held by the hook needle and the loop spreader, then the hook needle also rises and the spreader is retracted, so that the needle loop is dropped, and this needle loop is now around the shank of the needle which penetrates the hat body to form the next stitch. The finger 82 is so timed as to move against the strand of the needle loop extending between the hook of the needle and the spreader, and presses said strand backward away from the point of the hook needle, as the hook needle rises, and thus prevents the hook needle from entering its own loop, and enables the needle loop to be shed from said hook needle. The threads are drawn taut, and the stitch set by the movement of the thread eye on the needle lever. The eye-pointed needle reaches the upper end of its stroke slightly in advance of the hook needle, and the hook needle reaches the upper end of its stroke in time to take the loop from the looper for the formation of the next stitch.

Figures 8, 14:
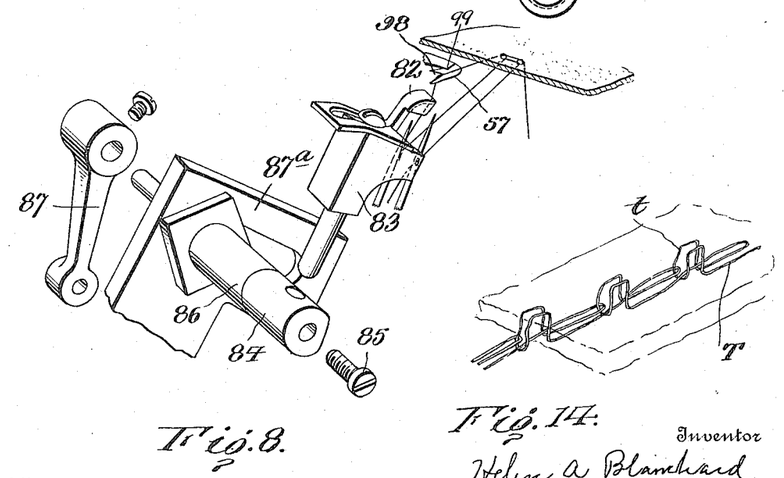
Fig. 8 is an enlarged detail in perspective showing the relation of the needles, the spreader and the material to the holding finger for the needle thread and the operating mechanism therefor, certain of the parts of said operating mechanism being detached for the sake of clearness.
Fig. 14 is a detail perspective view, showing more or less diagrammatically, the stitch formed by my machine.
Figure 9:
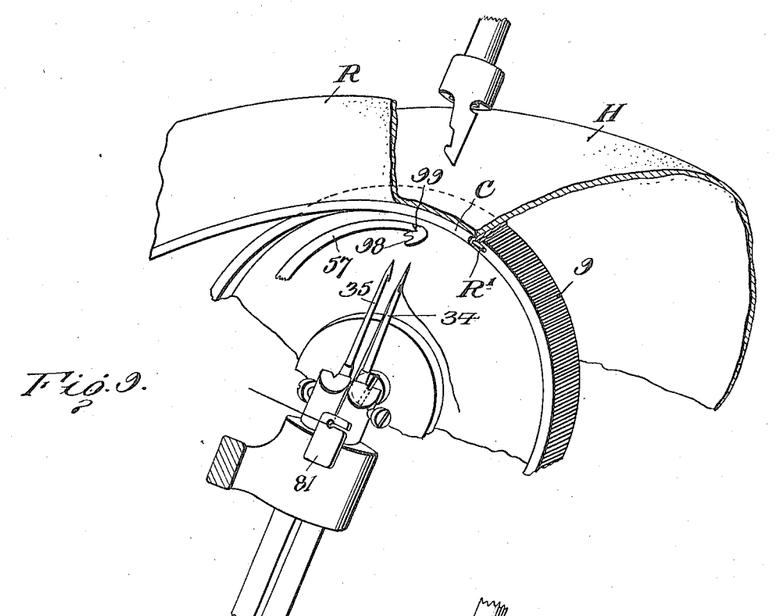
Fig. 9 is a view showing more or less diagrammatically, and in perspective, the stitch forming elements with the needle at the lower end of its stroke.
Figure 10:
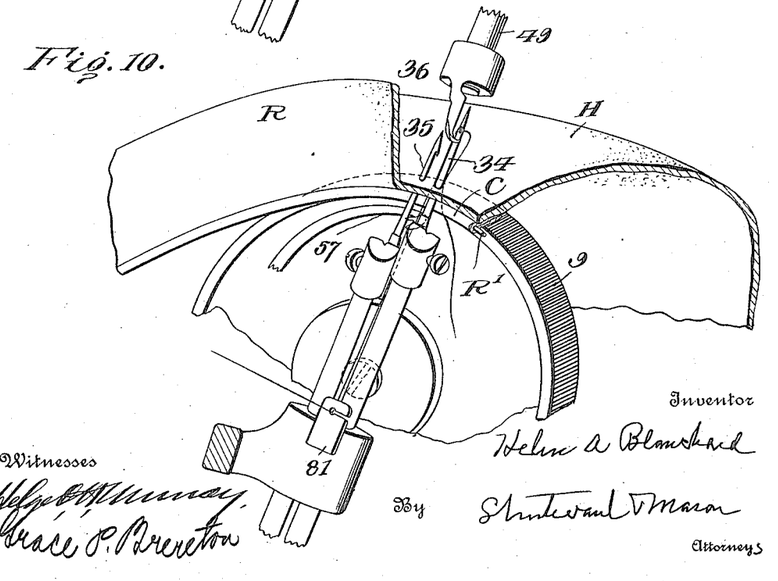
Fig. 10 is a similar view showing the needle at the upper end of its stroke.
Figure 11:
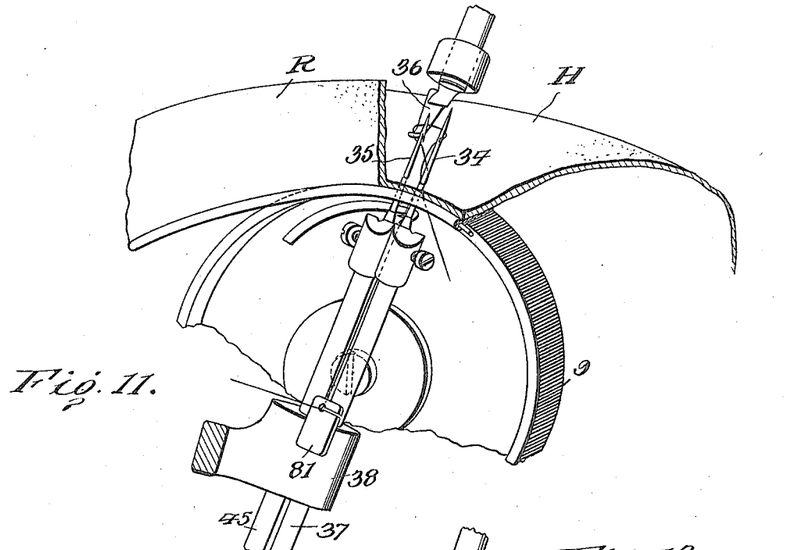
Fig. 11 is a similar view showing the hook needle at the upper end of its stroke, and taking the loop from the looper.
Figure 12:
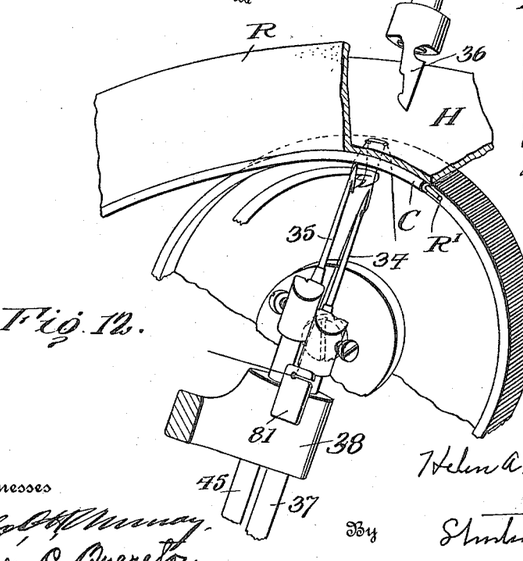
Fig. 12 is a similar view showing the hook needle drawing the loop through the material, and the eye-pointed needle at substantially the lower end of its stroke.
Figure 13:
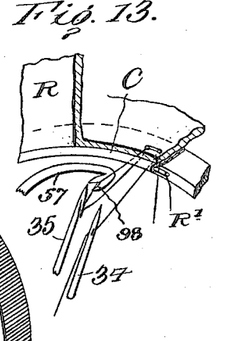
Fig. 13 is a detail in perspective showing the lower position of the hook needle, and the needle loop resting on the spreader.

In Fig. 14 I have shown more or less diagrammatically the stitch formed by the above described mechanism. The thread T is formed into a loop $t$ which is carried up through the work, thence laterally in the line of feed, and thence downwardly through the fabric, where the next loop formed by the needle passes through the first named loop and then through the fabric for forming the next stitch. It will be noted that the hook needle and the eye-pointed needle are substantially in line with the line of feed. The throw of the feed wheel 9 is such as to comparatively widely space the stitches, and I have thereby provided a stitching mechanism wherein the reed cover may be basted or stitched to the hat body by a series of loops, which are passed from the inner face of the hat body to the outer face thereof, and then returned through the hat body and reed cover, to the inner face, where it is locked by the next needle loop which is passed through the hat body to form the next succeeding stitch. These interlocked needle loops extend in substantially the line of feed.

From the above, it will be noted that the needle bars 37 and 45 are parallel. When the needles move through the fabric, inasmuch as they are parallel, the looper 36, which coöperates with these needles, may be set at some distance above the material as the needles are always the same distance apart laterally. This gives plenty of room for the manipulation of the article being stitched and readily permits the insertion of the same between the looper 36 and the work support. Furthermore, when the needles are retracted and are beneath the work support they are close together and a spreader may engage the loop of needle thread carried by the hook needle and open the same for the entrance of the eye-pointed needle. Attention is called particularly to these functions of the placing of the needles parallel, as such functions are not found in the type of stitching machine wherein needle bars move in lines at an angle to each other instead of parallel.

While I have described my machine as especially adapted for stitching a reed into a hat body, it will also be obvious that the reed may be stitched to the hat sweat on my machine. When stitching the reed to a hat sweat, the hat sweat stands upright, the same as the rim of the hat, and the reed portion is turned under the presser foot, where it is basted or stitched to the reed covering. It will also be obvious that my machine may be used for other purposes than stitching hats, and in fact for all classes of work in which the particular stitch above described is desirable.

Having thus described my invention, what I claim as new and desire to secure by Letters Patent, is:—

1. In a sewing machine, the combination of a curved cloth plate having a feed slot therein, a feed wheel projecting through said feed slot, means for intermittently rotating said feed wheel, stitch-forming mechanism including an eye-pointed needle, a hook needle, a looper for transferring the needle loop from the eye-pointed needle to the hook needle, and means for coöperating with the hook needle for positioning the needle loop for the entrance of the eye-pointed needle.

2. In a sewing machine, the combination of a curved cloth plate having a feed slot therein, a feed wheel projecting through said feed slot, means for intermittently rotating said feed wheel, and stitch-forming mechanism including an eye-pointed needle and a hook needle, a looper for transferring the needle loop from the eye-pointed needle to the hook needle, and a spreader coöperating with the hook needle for positioning the needle loop for the entrance of the eye-pointed needle.

3. In a sewing machine, the combination of a curved cloth plate having a feed slot therein, a feed wheel projecting through said feed slot, means for intermittently rotating said feed wheel, and stitch-forming mechanism including parallel reciprocating needle bars, an eye-pointed needle and a hook needle carried respectively by said needle bars, a looper for transferring the loop of needle thread from the eye-pointed needle to the hook needle above the material, devices for giving said needle bars a differential movement, and means coöperating with the hook needle beneath the cloth plate for positioning the needle loop carried thereby for the entrance of the eye-pointed needle.

4. In a sewing machine, the combination of a cloth plate, means for feeding the material over said cloth plate, a presser foot coöperating with said feeding means, and stitch-forming mechanism including parallel needle bars mounted beneath the cloth plate, an eye-pointed needle and a hook needle carried respectively by said needle bars, means for giving said needle bars a differential movement, a looper for transferring the needle loop from the eye-pointed needle to the hook needle, and means coöperating with the hook needle beneath the cloth plate for supporting the needle loop for the entrance of the needle.

5. In a sewing machine, the combination of a cloth plate, means for feeding the material over said cloth plate, a presser foot coöperating with said feeding means, and stitch-forming mechanism including parallel needle bars mounted beneath the cloth plate, an eye-pointed needle and a hook needle carried respectively by said needle bars, means for giving said needle bars a differential movement, a looper for transferring the needle loop from the eye-pointed needle to the hook needle, and a spreader located beneath the cloth plate and adapted to support the needle loop carried by the hook needle and spread said loop for the entrance of the eye-pointed needle.

6. In a sewing machine, the combination of a cloth plate, means for feeding the material over said cloth plate, a presser foot coöperating with said feeding means, and stitch-forming mechanism including parallel needle bars mounted beneath the cloth plate, an eye-pointed needle and a hook needle carried respectively by said needle bars, means for giving said needle bars a differential movement, a looper for transferring the needle loop from the eye-pointed needle to the hook needle, a spreader located beneath the cloth plate and adapted to support the needle loop carried by the hook needle and spread said loop for the entrance of the eye-pointed needle, and means for oscillating said spreader including devices whereby the throw of the spreader may be varied.

7. In a sewing machine, the combination of a cloth plate, means for feeding the material over said cloth plate, a presser foot coöperating with said feeding means, and stitch-forming mechanism including parallel needle bars mounted beneath the cloth plate and moving in a plane inclined to the vertical, an eye-pointed needle and a hook needle carried by the respective needle bars, means for giving said needle bars a differential movement, and a looper for transferring the needle loop from the eye-pointed needle to the hook needle, said looper being mounted above the cloth plate, and means for oscillating said looper.

8. In a sewing machine, the combination of a cloth plate, means for feeding the material over said cloth plate, a presser foot coöperating with said feeding means, and stitch-forming mechanism including parallel needle bars mounted beneath the cloth plate and moving in a plane inclined to the vertical, an eye-pointed needle and a hook needle carried by the respective needle bars, means for giving said needle bars a differential movement, and a looper mounted above the cloth plate for transferring the loop of needle thread from the eye-pointed needle to the hook needle, said looper being mounted to turn about an axis parallel with the plane of reciprocation of the needle bars, and means for oscillating said looper.

9. In a sewing machine, the combination of a cloth plate, means for feeding the material over said cloth plate, a presser foot coöperating with said feeding means, stitch-forming mechanism including parallel needle bars mounted beneath the cloth plate and moving in a plane inclined to the vertical, an eye-pointed needle and a hook needle carried by the respective needle bars, means for giving said needle bars a differential movement, a looper for transferring the needle loop from the eye-pointed needle to the hook needle, said looper being mounted above the cloth plate, means for oscillating said looper, and a spreader beneath the cloth plate for engaging the needle loop and spreading the same for the entrance of the eye-pointed needle.

10. In a sewing machine, the combination of a cloth plate, means for feeding the material over said cloth plate, a presser foot coöperating with said feeding means, stitch-forming mechanism including parallel needle bars mounted beneath the cloth plate and moving in a plane inclined to the vertical, an eye-pointed needle and a hook needle carried by the respective needle bars, means for giving said needle bars a differential movement, a looper mounted above the cloth plate for transferring the loop of needle thread from the eye-pointed needle to the hook needle, said looper being mounted to turn about an axis parallel with the plane of reciprocation of the needle bars, means for oscillating said looper, and a spreader beneath the cloth plate for engaging the needle loop and spreading the same for the entrance of the eye-pointed needle.

11. In a sewing machine, the combination of a curved cloth plate having a recess in its upper face and a feed slot in line with said recess, a feeding mechanism projecting through said feed slot, a presser foot coöperating with said cloth plate, a circular plate mounted above said cloth plate for supporting the hat body, and under which the reed cover may be guided, and stitch-forming mechanism including a needle bar mounted beneath the cloth plate, an eye-pointed needle carried thereby, and means coöperating with said eye-pointed needle for forming a stitch.

12. In a sewing machine, the combination of a curved cloth plate having a recess in its upper face and a feed slot in line with said recess, a feeding mechanism projecting through said feed slot, a presser foot coöperating with said cloth plate, a circular plate mounted above said cloth plate for supporting the hat body and under which the reed cover may be guided, and stitch-forming mechanism including needle bars mounted beneath the cloth plate, an eye-pointed needle and a hook needle carried by the respective needle bars, a looper mounted above the cloth plate for transferring the needle loop from the eye-pointed needle to the hook needle, and means coöperating with the hook needle beneath the cloth plate for supporting the needle loop for the entrance of the eye-pointed needle.

13. In a sewing machine, the combination of a curved cloth plate having a recess in its upper face, and a feed slot in line with said recess, a feeding mechanism projecting through said feed slot, a presser foot coöperating with said cloth plate, a circular plate mounted above said cloth plate for supporting the hat body and under which the reed cover may be guided, a guide shoe carried by said circular plate for engaging the rim of the hat body and guiding the same, and stitch-forming mechanism including a needle moving in a plane inclined to the cloth plate, and complemental stitch-forming devices coöperating therewith.

14. In a sewing machine, the combination of a curved cloth plate having a recess in its upper face, and a feed slot in line with said recess, a feeding mechanism projecting through said feed slot, a presser foot coöperating with said cloth plate, a circular plate mounted above said cloth plate for supporting the hat body and under which the reed cover may be guided, a guiding shoe carried by said circular plate for guiding the rim of the hat body, and stitch-forming mechanism including an eye-pointed needle and a hook needle adapted to penetrate the hat body, a looper for transferring the needle loop from the eye-pointed needle to the hook needle, and means coöperating with the hook needle beneath the cloth plate for supporting the needle loop for the entrance of the eye-pointed needle.

In testimony whereof, I affix my signature, in the presence of two witnesses.

HELEN A. BLANCHARD.

Witnesses:
CHARLES L. STURTEVANT,
HARRY C. BLASE.

Copies of this patent may be obtained for five cents each, by addressing the "Commissioner of Patents, Washington, D. C."